(No Model.)

J. J. SIGMAN.
PLOW.

No. 389,487. Patented Sept. 11, 1888.

WITNESSES
Edwin L. Yewell,
John Enders Jr.

INVENTOR
Jule J. Sigman
C. L. Myers & Co.
Attorneys.

UNITED STATES PATENT OFFICE.

JULE J. SIGMAN, OF HOLLY SPRINGS, MISSISSIPPI.

PLOW.

SPECIFICATION forming part of Letters Patent No. 389,487, dated September 11, 1888.

Application filed June 26, 1888. Serial No. 278,243. (No model.)

*To all whom it may concern:*

Be it known that I, JULE J. SIGMAN, a citizen of the United States of America, residing at Holly Springs, in the county of Marshall and State of Mississippi, have invented certain new and useful Improvements in Plows, of which the following is a specification, reference being had therein to the accompanying drawings.

This invention pertains to certain new and useful improvements in plows, having for its object the provision of new and improved simple and highly efficient means for securing two or more plow-shovels at the desired point, according to the width of the furrows it is desired to make.

The invention comprises the peculiar construction, combination, and arrangement of parts, substantially as hereinafter fully set forth, and particularly pointed out in the claim.

Figure 1:
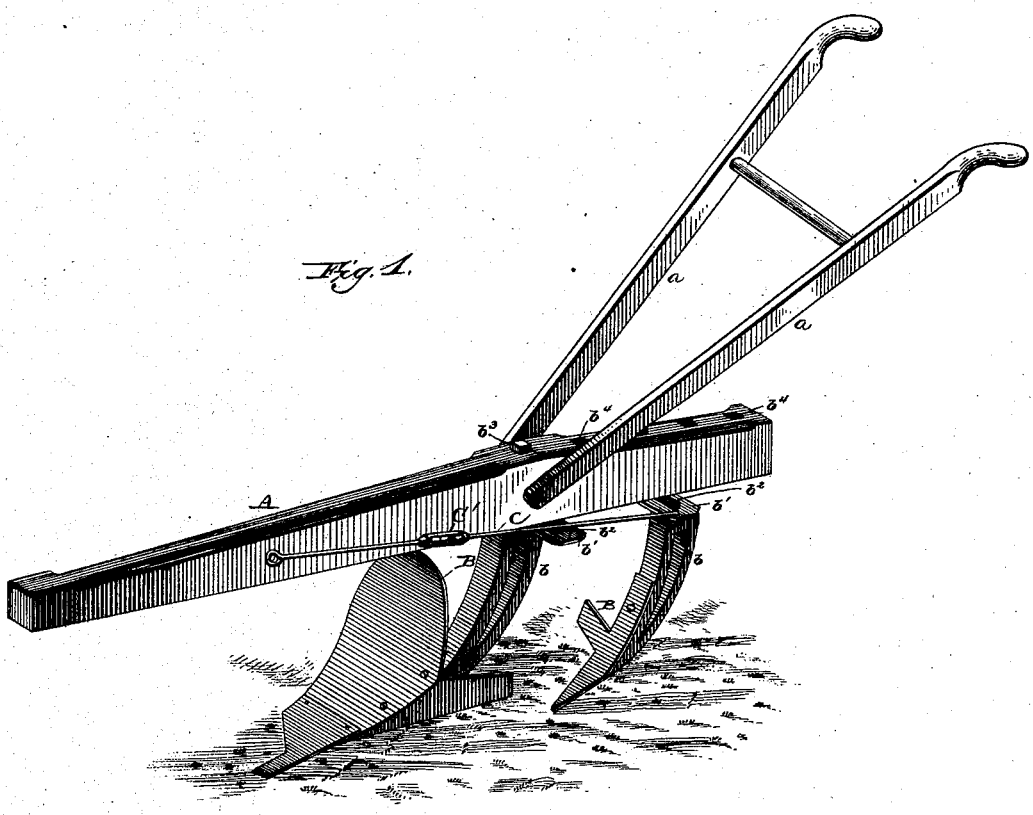
Figure 2:
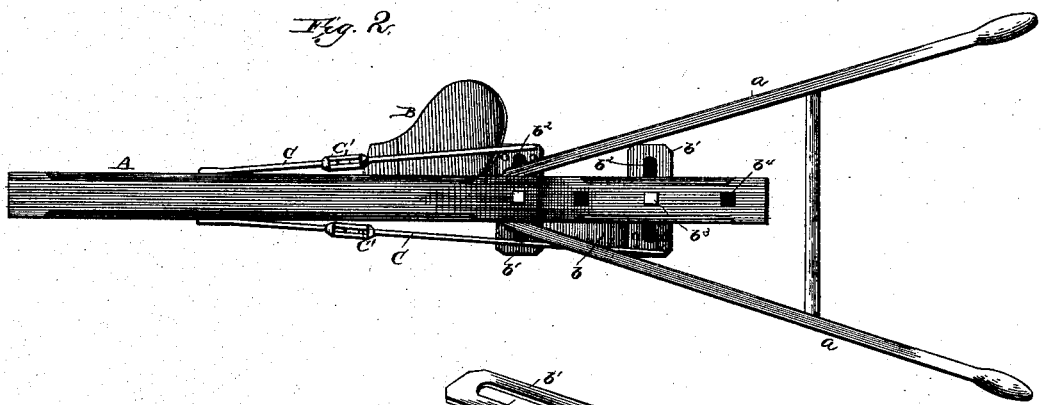
Figure 3:
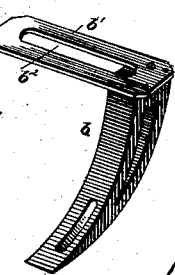

In the accompanying drawings, Figure 1 is a view in perspective of my improved plow. Fig. 2 is a plan view thereof, and Fig. 3 is a detail perspective view.

Referring to the drawings, A designates the plow-beam, of ordinary construction, and to it are connected the lower ends of the handles $a$.

To the under side of the beam A are secured at any desired point the standards of plow-shovels B B.

Each standard $b$ is preferably of the form shown, and to its lower forward end is secured the plow-shovel B. To the upper end of this standard is secured a right-angular plate, $b'$, projecting on either side of said standard. These plates $b'$ have each a central slot, $b^2$, through which a nutted bolt, $b^3$, is passed, said bolt being also passed through any one of a series of correspondingly-shaped apertures, $b^4$, in the plow-beam A.

C C are two reach-rods secured at their forward ends to the sides of the beam A, and the rear angular or bent ends of these rods are projected through apertures in the plates $b'$ and serve to hold the same in position. Each of these rods is composed of two parts suitably connected together, preferably by a right-and-left screw-nut coupling or turn-buckle, C', or its equivalent. By this means the reach-rods can be shortened or lengthened according to the points at which the standards are secured.

It will be seen that the plow-shovels can be secured at the desired point, and can be moved to the right or to the left. By this means a double turning plow is secured, or one that will make two furrows, as in the gang-plow. One of these plows may be a right-hand and the other a left-hand plow, thus making a double plow to turn a furrow in opposite directions.

The rear plow can follow directly behind the front plow and act as a subsoiler; or by removing the shovel from the rear standard a larger shovel can be substituted, thus producing a corn-cultivator.

It will be seen that my invention is extremely simple, cheap, and durable, and as it comprises but few parts it is not liable to readily get out of order.

I claim as my invention—

As an improvement in plows, the combination, with the beam having a series of holes or apertures, of the standards having the slotted right-angular side plates, the nutted bolts for adjustably securing said plates to said beam, and the reach-rods secured at their forward ends to said beam, and having rear right-angular ends designed to project through apertures of said plates, substantially as shown and described.

In testimony whereof I affix my signature in presence of two witnesses.

JULE J. SIGMAN.

Witnesses:
E. D. MILLER,
E. M. WRIGHT.